(12) United States Patent
Kellner et al.

(10) Patent No.: US 11,777,159 B2
(45) Date of Patent: Oct. 3, 2023

(54) TRACTION BATTERY MODULE FOR A VEHICLE

(71) Applicant: Dr. Ing. h.c. F. Porsche Aktiengesellschaft, Stuttgart (DE)

(72) Inventors: Philipp Kellner, Rennigen (DE); Christopher Volkmer, Niefern-Öschelbronn (DE); Sascha Mostofi, Zeltingen (DE); Dieter Schiebel, Korntal-Münchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 191 days.

(21) Appl. No.: 17/333,103

(22) Filed: May 28, 2021

(65) Prior Publication Data

US 2021/0376408 A1   Dec. 2, 2021

(30) Foreign Application Priority Data

May 29, 2020 (DE) ...................... 10 2020 114 481.4

(51) Int. Cl.
*H01M 10/6556* (2014.01)
*H01M 50/207* (2021.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 50/207; H01M 50/249;
(Continued)

(56) References Cited

U.S. PATENT DOCUMENTS 9,306,224 B2 * 4/2016 Von Borck ........ H01M 10/6556
9,748,538 B2   8/2017 Fritz et al.
(Continued)

FOREIGN PATENT DOCUMENTS

DE   102010032899 A1   2/2012
DE   102013209980 A1   12/2014
(Continued)

OTHER PUBLICATIONS

Great Britain Combined Search and Examination Report for Great Britain Application No. GB2107527.0, dated Feb. 8, 2022, 6 pages.

*Primary Examiner* — Kaity V Chandler

(74) *Attorney, Agent, or Firm* — RatnerPrestia

(57) ABSTRACT

A traction battery module for a vehicle, with a battery housing, the battery housing having a preferably extruded housing part with hollow chambers formed in it, which extend alongside one another along a central longitudinal direction and are open at the ends. The hollow chambers respectively define a cooling channel. At least one cooling connection adapter is provided, having a non-circular outer circumferential surface in an insertion portion and having been introduced or pressed at the end into one of the hollow chambers with an inner circumferential surface corresponding to the outer circumferential surface of the insertion portion. A pressing engagement is formed, at least in certain portions, between the outer circumferential surface and the inner circumferential surface.

12 Claims, 3 Drawing Sheets

(51) Int. Cl.
*H01M 10/613* (2014.01)
*H01M 10/625* (2014.01)
*H01M 50/249* (2021.01)

(52) U.S. Cl.
CPC ....... *H01M 50/207* (2021.01); *H01M 50/249* (2021.01); *H01M 2220/20* (2013.01)

(58) Field of Classification Search
CPC ........... H01M 2220/20; H01M 50/271; H01M 10/6567; H01M 50/204; B60L 50/64; B60L 58/26; Y02E 60/10; Y02T 10/70
See application file for complete search history.

(56) References Cited

U.S. PATENT DOCUMENTS

| | | | |
|---|---|---|---|
| 10,263,301 B2 * | 4/2019 | Kenney | B23P 15/26 |
| 11,437,668 B2 * | 9/2022 | Schmitt | F28F 3/04 |
| 2013/0189557 A1 | 7/2013 | Haussmann | |
| 2015/0207115 A1 | 7/2015 | Wondraczek | |

FOREIGN PATENT DOCUMENTS

| | | | | |
|---|---|---|---|---|
| DE | 102018203108 A1 | | 9/2019 | |
| EP | 2461416 A2 | | 6/2012 | |
| EP | 3553876 A1 | | 10/2019 | |
| EP | 3573129 A1 | | 11/2019 | |
| FR | 2967246 A1 | * | 5/2012 | ......... F28D 1/05358 |
| GB | 2586058 A | * | 2/2021 | ............ F28F 9/0253 |
| KR | 20140020796 A | | 2/2014 | |

* cited by examiner

TRACTION BATTERY MODULE FOR A VEHICLE

CROSS-REFERENCE TO RELATED APPLICATION

This application claims priority to German Patent Application No. 10 2020 114 481.4, filed May 29, 2020, the content of such application being incorporated by reference herein in its entirety.

FIELD OF THE INVENTION

The invention relates to a traction battery module for a vehicle.

BACKGROUND OF THE INVENTION

DE 10 2010 032 899 A1, which is incorporated herein by reference, discloses a cooling plate, which lies flat against a battery cell group, the cooling plate comprising multiple U-shaped flat lines having cooling channels and also comprising a distributor. The cooling plate is positioned on or under a battery cell group. Consequently, the cooling effect is restricted to one-sided cooling and there is a comparatively great installation space requirement.

SUMMARY OF THE INVENTION

Described herein is a traction battery module that is improved in comparison to the module described in the background section. In particular, a structurally favorable connection of the components and a low installation space requirement are desirable.

The traction battery module is designed for a vehicle, in particular for a partially electrically or fully electrically operated electric vehicle. The traction battery module comprises a battery housing, which has a preferably extruded housing part (central housing part) with hollow chambers formed in it. The hollow chambers extend alongside one another, in particular in a parallel arrangement in relation to one another, along a central longitudinal direction (or the direction of extrusion). The hollow chambers are open at the ends, i.e. to the end sides of the housing part. The hollow chambers respectively define a cooling channel (walls of the hollow chambers delimit a cooling channel laterally outward). At least one cooling connection adapter is provided, having a non-circular outer circumferential surface in an insertion portion (outer circumferential surface with a contour other than circular). The insertion portion has been introduced or pressed at the end into one of the hollow chambers (open at the end) with an inner circumferential surface corresponding to the outer circumferential surface of the insertion portion (inner circumferential surface with a contour other than circular). A pressing engagement is formed, at least in certain portions (axially), between the outer circumferential surface and the inner circumferential surface.

In this way, a structurally favorable interface of a cooling connection is created, without any further joining elements necessarily being required. A sealing between the two parts to be joined is achieved by a pressing engagement (for example a selected transition fit or press fit) between the inner circumferential surface of the hollow chamber or the cooling channel and the outer circumferential surface of the insertion portion of the cooling connection adapter. The outer circumferential surface of the insertion portion and the inner circumferential surface of the hollow chamber preferably have the same contour. During joining, an elastic or plastic deformation of the hollow chamber or of the cooling connection adapter may occur. This type of construction contributes to a low installation space requirement of the cooling connections. Hollow chambers or cooling channels with a non-round, for example substantially rectangular, cross section are advantageous for good package efficiency.

The proposed interface creates a fluid connection between the cooling connection adapter and the hollow chamber or cooling channel. The cooling channel is designed for a cooling medium to flow through. The cooling connection adapter can be used for connecting the traction battery module to a cooling circuit of a cooling system for the traction battery module.

The hollow chambers may be arranged in the housing part alongside one another, for example parallel to one another, and optionally fluidically connected to one another. The pressing engagement between the inner circumferential surface and the outer circumferential surface may be formed at least in certain portions axially (i.e. over an axial portion) and/or running around in the circumferential direction. The cooling connection adapter may have an insertion part and a connection part.

The traction battery module may represent part of a traction battery for a vehicle, while the traction battery may be formed by one or more traction battery modules.

Preferably, the hollow chamber into which the cooling connection adapter has been pressed may have a receiving portion for receiving the insertion portion of the cooling connection adapter, the cross section of the hollow chamber being widened in the receiving portion (compared to the cross section of the hollow chamber outside the receiving portion), for example laterally outward, in particular by machining, for example by milling (the receiving portion may be formed in a material-removing manner, in particular by milling). This contributes to a low installation space requirement. The hollow chamber of the battery housing may be less stiff because of smaller wall thicknesses at the receiving portion. Consequently, an elastic or plastic deformation can occur more easily. This is conducive to fastening the parts to be joined.

Preferably, the insertion portion may have a first (axial) region, in which a lead-in bevel is formed (lead-in region). The lead-in bevel may be formed at the free end of the insertion portion. At the lead-in bevel, the cross section may taper, in particular conically, toward the free end. This facilitates the operation of joining the housing part and the cooling connection adapter.

Preferably, the insertion portion may have a further (axial) region, in which the pressing engagement is formed (fitting region). Consequently, the region in which the non-positive fastening of the parts to be joined takes place is separate from the insertion region (two separate axial portions).

Preferably, the insertion portion may have in the region in which the pressing engagement is formed (fitting region) a constant, for example cylindrically extending, cross section along a central longitudinal direction. This has the effect that on the outer side of the insertion portion there is a comparatively large area in which a fit/pressing engagement can be formed.

As an alternative to this, the insertion portion may have in the region in which the pressing engagement is formed (fitting region) an outwardly widening, for example convex or bulging, shape along a central longitudinal direction. An increased contact pressure and thus an increased sealing action can be achieved on account of this shape (curvature). This is conducive to fastening and/or sealing the parts to be joined.

The bulging shape may be formed in such a way that it brings about a uniform distribution of force over the surfaces that are not concentric to a center point. As an alternative to this, the bulging shape may be formed in such a way that it leads to a local plastic deformation of the for example extruded housing part of the battery housing, which results in enhancement of the sealing effect.

Preferably, the pressing engagement between the outer circumferential surface of the insertion portion (for example in the fitting region) and the inner circumferential surface of the hollow chamber (for example in the receiving region) may be chosen in such a way that the cooling connection adapter is cooled down for joining and/or the housing part is warmed up for joining. By adjusting the temperature of the parts to be joined, the joining forces are reduced, which reduces the risk of damage. The pressing engagement may be formed as a press fit, so that stable and reliable fastening is always obtained.

Preferably, a rubber seal and/or an adhesive seal may be arranged in the insertion portion, in particular in the fitting region. This is an additional fastening or securing element, whereby sealing and connection between the parts to be joined can be optimized.

Preferably, the cooling connection adapter may have a connection piece remote from the insertion portion. This allows a connection to be made to a cooling circuit for the cooling system of the traction battery module. The connection piece may have a circular or elliptical cross section.

Preferably, the cooling connection adapter may have a fluid channel for a cooling medium to pass through, the fluid channel being divided in the insertion portion into multiple adjacent channel segments by webs. This allows the cooling connection adapter and the fluid channel formed inside it to be adapted to the hollow chamber or the cooling channel. The webs may be formed and/or arranged in such a way that the insertion portion has sufficient stiffness for the press fit. The webs may have a cross section that tapers inward from the free end (starting cross section). The cross section of the webs may end at the transition to the connection piece in a tapering manner (for example pointed or rounded). The channel segments remaining between the webs may have a circular or elliptical cross section.

Preferably, a plurality of battery cells may be arranged in the battery housing, in particular in a further hollow chamber that is adjacent to the hollow chambers with the cooling channels. Apart from defined positioning of the battery cells, sufficient heat dissipation can be achieved, and consequently good cooling.

Preferably, the battery housing may have (apart from a for example extruded housing part) one or two covers, which are respectively arranged at the ends of the housing part and close the ends of the hollow chambers into which no cooling connection adapter has been introduced. This creates a termination of the housing part (central housing part). Adjacent hollow chambers or cooling channels can be fluidically connected through the cover (adjacent channels can form a flow and a return).

BRIEF DESCRIPTION OF THE DRAWING FIGURES

The invention is explained in more detail below on the basis of the figures, elements that are the same or functionally the same being provided with identical reference signs, but possibly only once. In the figures.

DETAILED DESCRIPTION OF THE INVENTION

Figure 1:
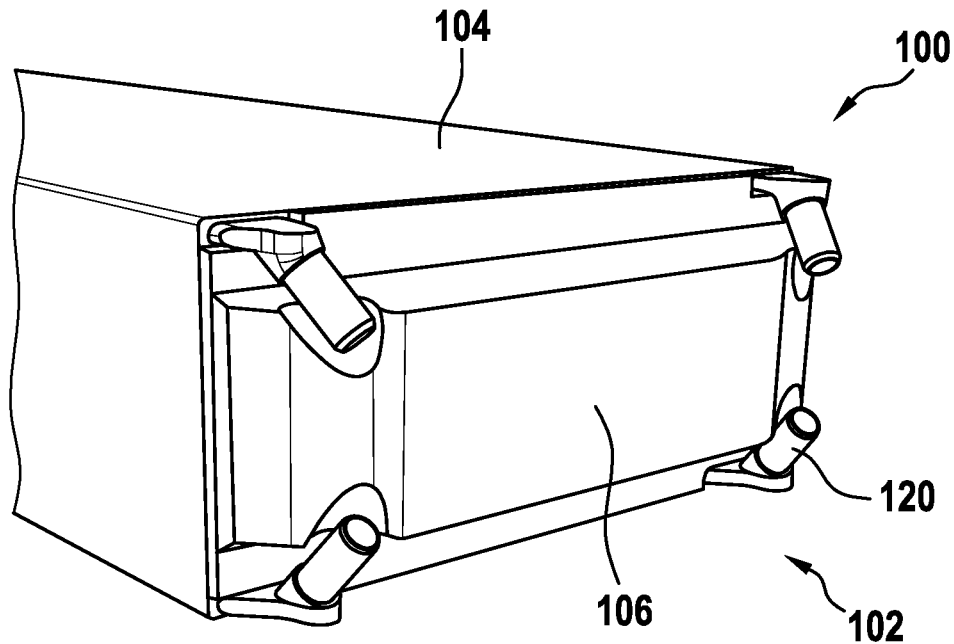
FIG. 1 shows an embodiment of the traction battery module in a partially perspective view.

FIG. 1 shows a traction battery module for a vehicle, which is denoted overall by the reference sign 100. The traction battery module 100 comprises a battery housing 102, which has an extruded housing part 104 (central housing part 104) and two covers 106, which respectively close the housing part 104 at the ends (only one cover 106 is shown).

Figure 2:
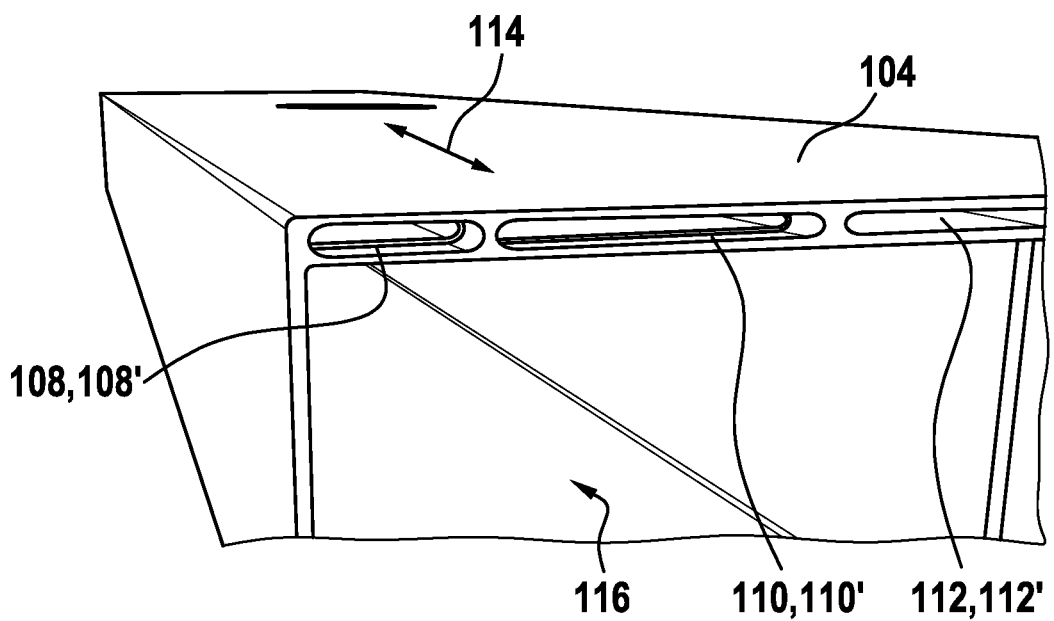
FIG. 2 shows the central housing part of the traction battery module from FIG. 1 on its own.

Formed in the housing part 104 are hollow chambers 108, 110, 112, which extend alongside one another parallel to one another along a central longitudinal direction 114 (cf. FIG. 2). The hollow chambers 108, 110, 112 are open at the ends, i.e. to the end sides of the housing part 104. The hollow chambers 108, 110, 112 respectively define a cooling channel 108', 110', 112' (walls of the hollow chambers 106, 108, 110 delimit a cooling channel 108', 110', 112' laterally outward).

For the connection of the traction battery module 100 to a cooling system (not shown), one or more cooling connection adapters 120 are provided (cf. FIG. 1). In the example, four cooling connection adapters 120 are provided. The cooling connection adapters 120 have been introduced into the hollow chambers that are not closed by the cover 106, for example into the hollow chamber 108 (cf. FIGS. 1 and 2). The hollow chambers 110, 112 into which no cooling connection adapter 120 has been introduced are closed at the ends by the cover 106. Adjacent hollow chambers or cooling channels can be fluidically connected to one another through the cover 106.

Figure 3:
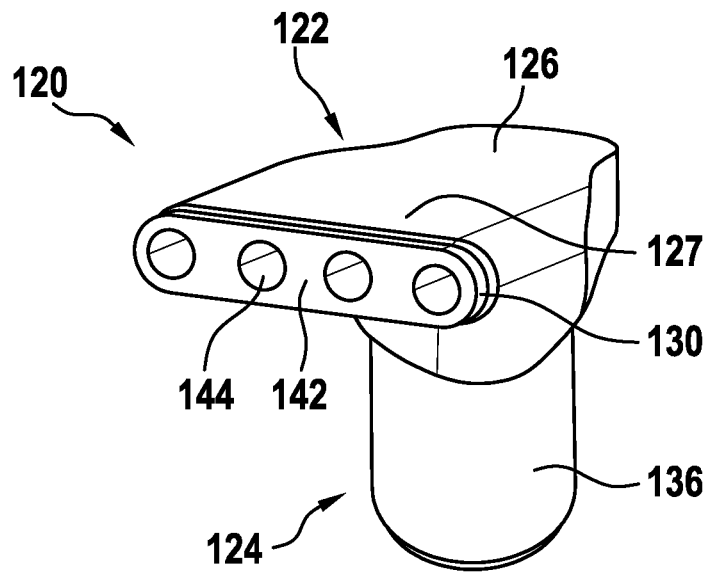
FIG. 3 shows the cooling connection adapter of the traction battery module from FIG. 1 on its own.

The cooling connection adapter 120 has an insertion part 122 and a connection part 124 (cf. FIG. 3). In an insertion portion 126 (portion of the insertion part 122), the cooling connection adapter 120 has a non-circular outer circumferential surface (a circumferential surface with a contour other than circular). The insertion portion 126 has been introduced or pressed at the end into one of the hollow chambers 108 with an inner circumferential surface corresponding to the outer circumferential surface of the insertion portion 126 (inner circumferential surface with a contour other than circular) (cf. FIGS. 4 and 5). A pressing engagement 127 is formed, at least in certain portions axially, between the outer circumferential surface and the inner circumferential surface.

Figure 4:
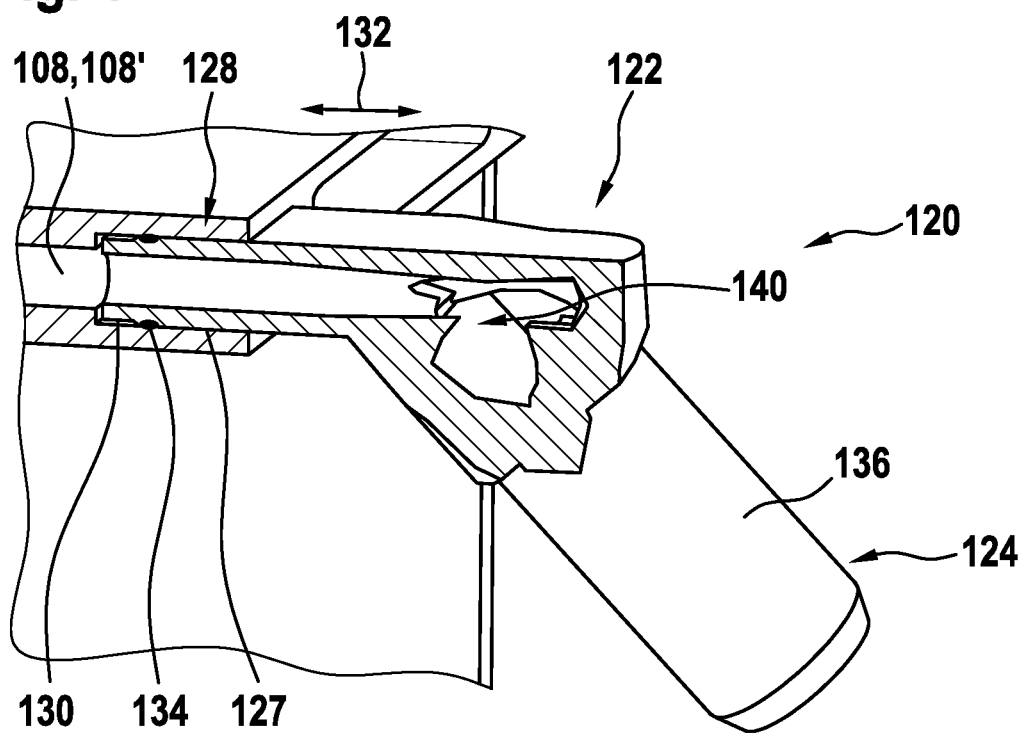
FIG. 4 shows the cooling connection adapter inserted into the housing part in a perspective and partially sectional view.

The hollow chamber 108 into which the cooling connection adapter 120 has been pressed has a receiving portion 128 for receiving the insertion portion 126 (cf. FIG. 4). The cross section of the hollow chamber 108 is widened in the receiving portion 128 (compared to the cross section of the hollow chamber outside the receiving portion 128), in particular by machining, for example by milling.

The insertion portion 126 has a first (axial) region, in which a lead-in bevel 130 is formed (lead-in region 130). The lead-in bevel 130 is formed at the free end of the insertion portion 126. At the lead-in bevel 130, the cross section tapers, for example conically, toward the free end. The insertion portion 136 has a further (axial) region, in which the pressing engagement 127 is formed (fitting region 127).

The insertion portion 126 has in the region in which the pressing engagement 127 is formed (fitting region 127) a constant, for example cylindrically extending, cross section along a central longitudinal direction 132 (cf. FIG. 4)

The pressing engagement 127 between the outer circumferential surface of the insertion portion 126 and the inner circumferential surface of the hollow chamber 108 may be chosen in such a way that the cooling connection adapter 120 is cooled down for joining and/or the housing part 104 is warmed up for joining.

A rubber seal and/or an adhesive seal 134 may be optionally arranged in the insertion portion 126, in particular in the fitting region 127 (cf. FIG. 4).

The cooling connection adapter 120 has a connection piece 136 remote from the insertion portion 126 (in the connection part 124) (cf. FIGS. 3 and 4). This allows a connection to be made to a cooling circuit for the cooling system of the traction battery module (not shown). The connection piece 136 has in the example a circular or elliptical cross section.

Figure 5:
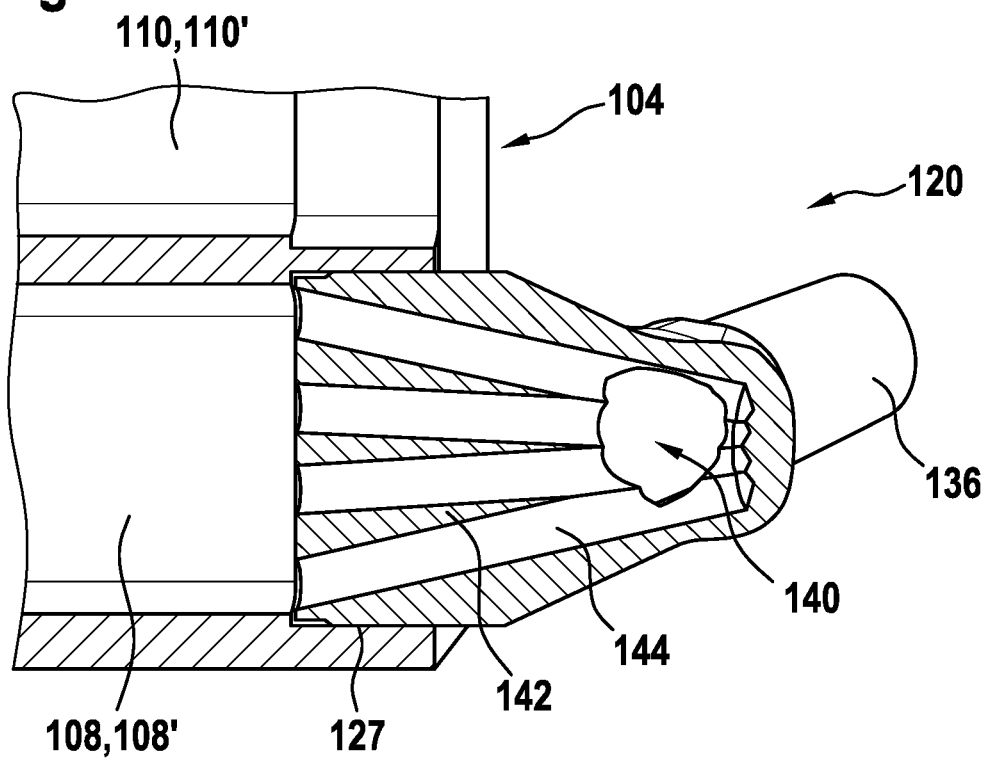
FIG. 5 shows the cooling connection adapter inserted into the housing part in a partially sectional plan view.

The cooling connection adapter 120 has a fluid channel 140 for a cooling medium to pass through, the fluid channel 140 being divided in the insertion portion 126 into multiple adjacent channel segments 144 by webs 142 (cf. FIGS. 3 and 5). The webs 142 are formed and/or arranged in such a way that the insertion portion 126 has sufficient stiffness for the press fit. The webs 142 may have a cross section that tapers inward from the free end of the insertion portion 126. The cross section of the webs may end at the transition to the connection piece 136 in a tapering manner (for example pointed or rounded). The channel segments 144 remaining between the webs 142 may have a circular or elliptical cross section.

A plurality of battery cells (not shown) are arranged in the battery housing 102, specifically for instance in a further hollow chamber 116 that is adjacent to the hollow chambers 108, 110, 112 with the cooling channels 108', 110', 112' (cf. FIG. 2).

Figure 6:
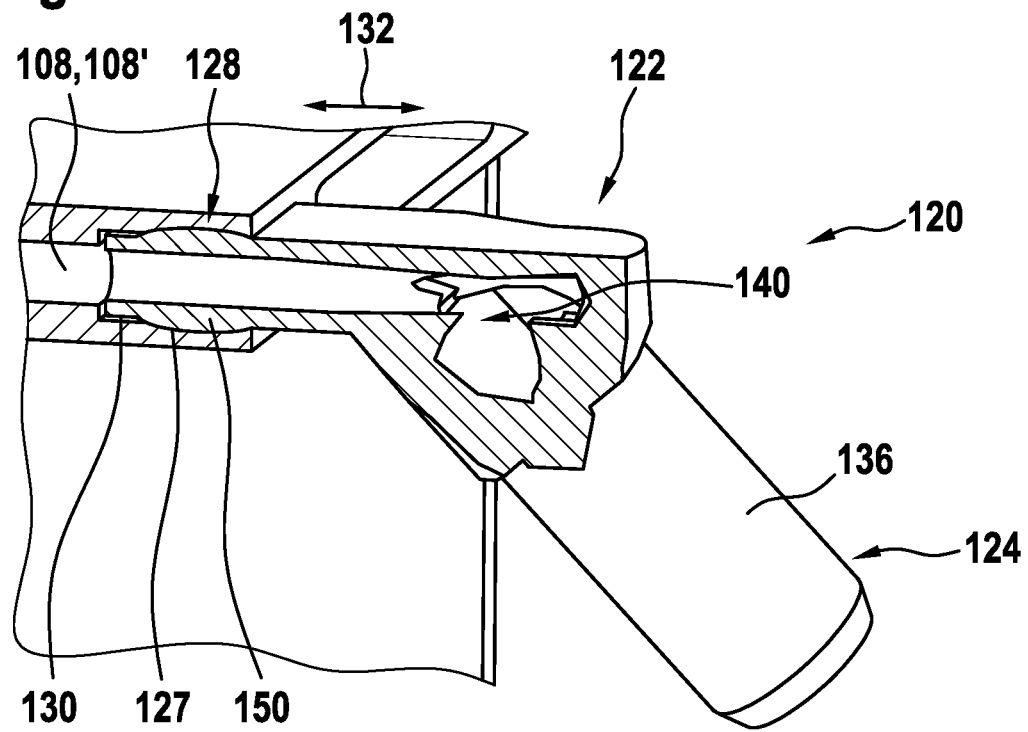
FIG. 6 shows a possibility for the configuration of the cooling connection adapter and the housing part in a perspective and partially sectional view.

FIG. 6 shows a configuration of the traction battery module 100 that largely corresponds to the configuration described above, so that to avoid repetition reference is made to the statements made above.

As a departure from this, the insertion portion 126 has in the region in which the pressing engagement 127 is formed (fitting region 127) an outwardly widening, for example convex or bulging, shape 150 along a central longitudinal direction 32. The bulging shape 150 may be formed in the way described above.

What is claimed:

1. A traction battery module for a vehicle comprising:
    a battery housing having an extruded housing part with hollow chambers formed therein that extend alongside one another along a central longitudinal direction and are open at ends thereof, the hollow chambers respectively defining a cooling channel,
    at least one cooling connection adapter including an insertion portion having a non-circular outer circumferential surface, the at least one cooling connection adapter installed at an end thereof into one of the hollow chambers,
    wherein an inner circumferential non-circular surface of one of the hollow chambers corresponds in shape to the outer circumferential non-circular surface of the insertion portion, and
    wherein a pressing engagement is formed, at least in certain portions, between the outer circumferential non-circular surface and the inner circumferential non-circular surface, wherein the hollow chamber has a non-circular receiving portion for receiving the non-circular insertion portion of the cooling connection adapter, a cross section of the hollow chamber being widened in the non-circular receiving portion.

2. The traction battery module as claimed in claim 1, wherein the insertion portion has a first region, in which a lead-in bevel is formed, and/or a further region, in which the pressing engagement is formed.

3. The traction battery module as claimed in claim 1, wherein the insertion portion has, in a region in which the pressing engagement is formed, a constant cross section along the central longitudinal direction.

4. The traction battery module as claimed in claim 1, wherein the insertion portion has, in the region in which the pressing engagement is formed, an outwardly widened shape along the central longitudinal direction.

5. The traction battery module as claimed in claim 1, wherein the pressing engagement between the outer circumferential surface of the insertion portion and the inner circumferential surface of the hollow chamber is configured in such a way that the cooling connection adapter is cooled down for joining the insertion portion and the hollow chamber and/or the housing part is warmed up for joining the insertion portion and the hollow chamber.

6. The traction battery module as claimed in claim 1, further comprising a rubber seal and/or an adhesive seal arranged in the insertion portion.

7. The traction battery module as claimed in claim 1, wherein the cooling connection adapter has a connection piece remote from the insertion portion and/or wherein the cooling connection adapter has a fluid channel for a cooling medium to pass through, the fluid channel being divided in the insertion portion into multiple adjacent channel segments by webs.

8. The traction battery module as claimed in claim 1, wherein a plurality of battery cells are arranged in a further hollow chamber of the battery housing that is adjacent to the hollow chambers, and/or wherein the battery housing has either one or two covers, which are respectively arranged at ends of the extruded housing part and close the ends of the hollow chambers into which no cooling connection adapter has been introduced.

9. The traction battery module as claimed in claim 1, wherein a plurality of battery cells are arranged in a further hollow chamber of the battery housing that is adjacent to the hollow chambers.

10. The traction battery module as claimed in claim 1, wherein the cross section of the non-circular receiving portion of the hollow chamber is wider than a remainder of a width of the hollow chamber.

11. A traction battery module for a vehicle comprising:
    a battery housing having an extruded housing part with hollow chambers formed therein that extend alongside one another along a central longitudinal direction and are open at ends thereof, the hollow chambers respectively defining a cooling channel, at least one cooling connection adapter including an insertion portion having a non-circular outer circumferential surface, the at least one cooling connection adapter installed at an end thereof into one of the hollow chambers, wherein an inner circumferential non-circular surface of one of the hollow chambers corresponds in shape to the outer circumferential non-circular surface of the insertion portion, and wherein a pressing engagement is formed, at least in certain portions, between the outer circumferential non-circular surface and the inner circumferential non-circular surface, wherein the cooling connection adapter has a fluid channel for a cooling medium to pass through, the fluid channel being divided in the insertion portion into multiple adjacent channel segments by webs, wherein the multiple adjacent channel segments are fluidly isolated from each other and are fluidly connected together at a common point located internally to the adapter.

12. A traction battery module for a vehicle comprising:

a battery housing having an extruded housing part with hollow chambers formed therein that extend alongside one another along a central longitudinal direction and are open at ends thereof, the hollow chambers respectively defining a cooling channel, at least one cooling connection adapter including an insertion portion having a non-circular outer circumferential surface, the at least one cooling connection adapter installed at an end thereof into one of the hollow chambers, wherein an inner circumferential non-circular surface of one of the hollow chambers corresponds in shape to the outer circumferential non-circular surface of the insertion portion, and wherein a pressing engagement is formed, at least in certain portions, between the outer circumferential non-circular surface and the inner circumferential non-circular surface, wherein the battery housing has either one or two covers, which are respectively arranged at ends of the extruded housing part and close the ends of the hollow chambers into which no cooling connection adapter has been introduced.

* * * * *